United States Patent [19]

Bowman, Jr.

[11] 3,951,484

[45] Apr. 20, 1976

[54] ROLLER ASSEMBLY IN A TURN CHAIN ASSEMBLY

[75] Inventor: John H. Bowman, Jr., Oaklawn, Ill.

[73] Assignees: Albert G. Nicholson; Robert W. Nicholson, both of Worth, Ill.

[22] Filed: Apr. 14, 1975

[21] Appl. No.: 567,783

[52] U.S. Cl. ............................... 308/228; 74/216.5; 308/189 R; 308/193
[51] Int. Cl.² ........................................ F16C 35/08
[58] Field of Search ............ 308/184 R, 188, 189 A, 308/193, 202, 207 A, 173, 208, 227, 228, 20, 230; 74/216.5

[56] References Cited
UNITED STATES PATENTS

| | | | |
|---|---|---|---|
| 2,804,358 | 8/1957 | Erikson | 308/184 R |
| 3,001,840 | 9/1961 | Musser | 308/184 R |
| 3,041,889 | 7/1962 | Haushalter | 308/184 R |
| 3,360,998 | 1/1968 | Griffel | 308/184 R |

*Primary Examiner*—M. H. Wood, Jr.
*Assistant Examiner*—Richard A. Bertsch
*Attorney, Agent, or Firm*—Thomas R. Vigil

[57] ABSTRACT

The roller assembly is utilized at the end of a turn in a turn chain assembly in a towveyor system. In the towveyor system a tow chain is guided and carried around the turn by a turn chain of the turn chain assembly. The roller assembly includes a non-rotatable stub shaft, a larger diameter, rotatable, hollow cylinder coaxial with the stub shaft, two axially spaced ball bearings rotatably mounting the cylinder on the shaft and a collar fixed on the cylinder for maintaining a tow chain at a desired height while it travels around the cylinder. A portion of the shaft extends axially beyond the cylinder for mounting the roller assembly in the turn chain assembly.

10 Claims, 5 Drawing Figures

U.S. Patent   April 20, 1976   Sheet 2 of 2   3,951,484
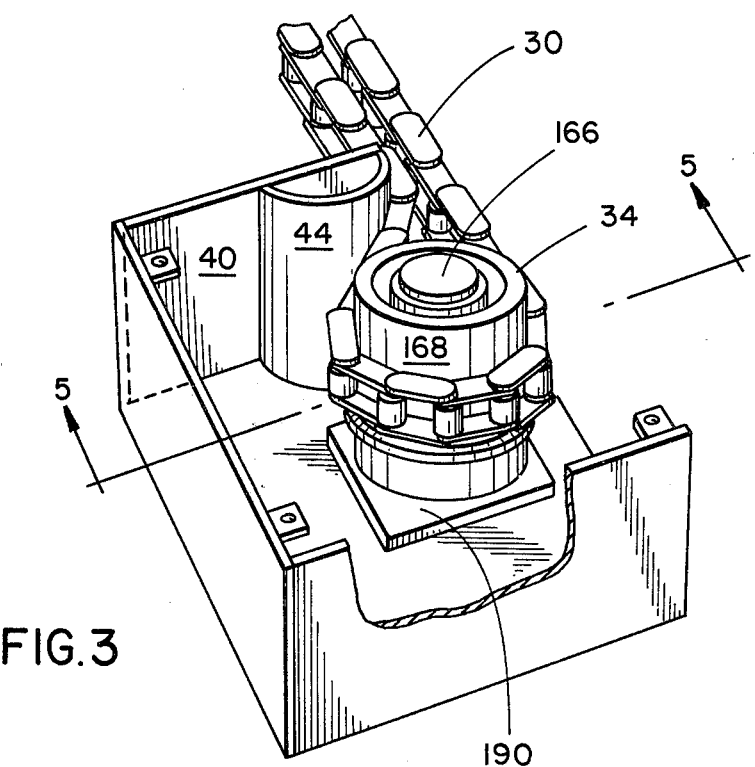
FIG. 3
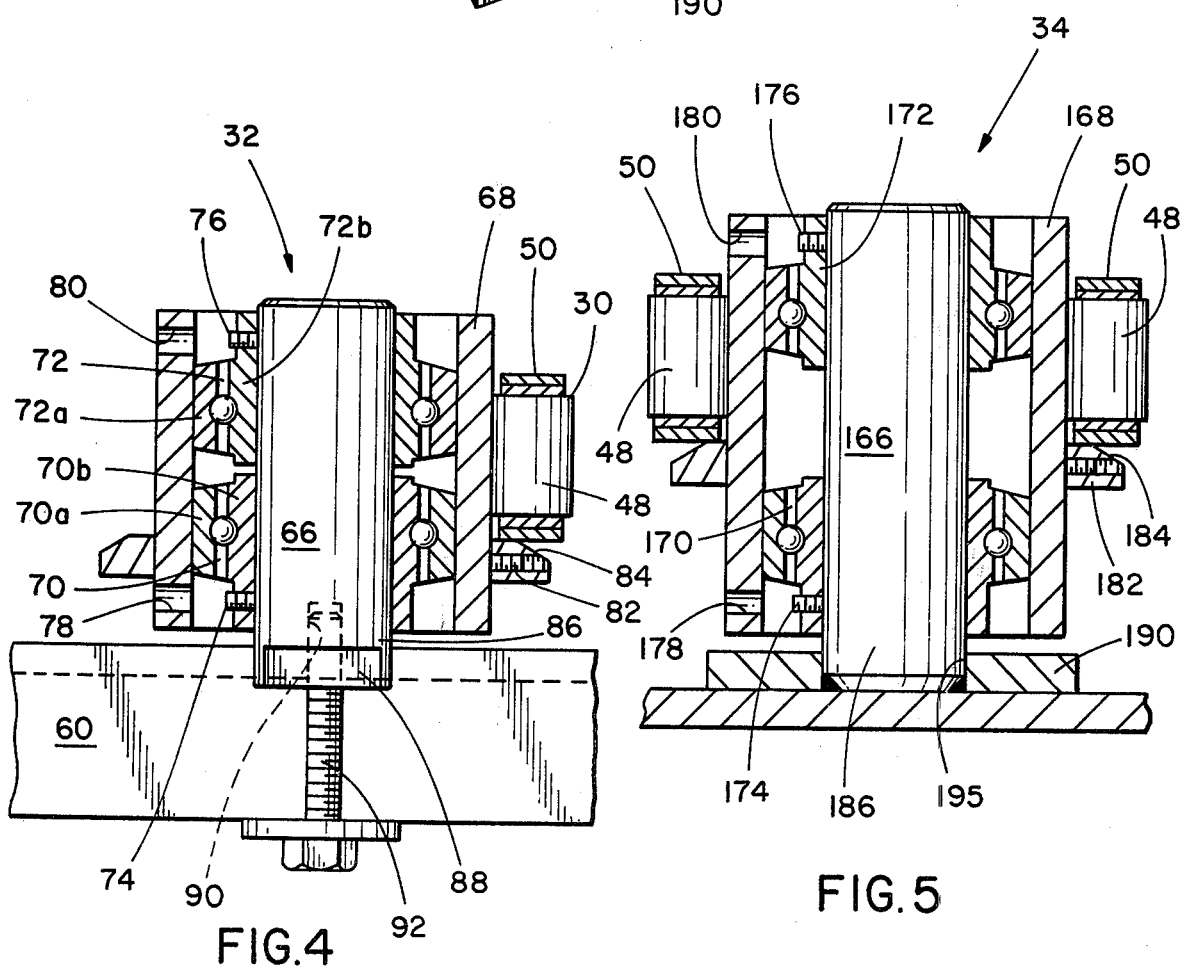
FIG. 4
FIG. 5

ROLLER ASSEMBLY IN A TURN CHAIN ASSEMBLY

BACKGROUND OF THE INVENTION

The present invention relates to a roller assembly for use in a turn chain assembly of a towveyor system of the type manufactured and sold by S.I. Handling Systems of Easton, Pennsylvania.

In a so-called low profile towveyor system made by S.I. Handling Systems, a continuous tow chain is supported just beneath the floor in a warehouse. The tow chain is positioned for continuous movement through a closed circuit horizontal path beneath a slot in the warehouse floor and has spaced apart recessed dogs thereon. The dogs are typically spaced 10½ feet apart and each dog is adapted to engage a lug depending from a cart or carriage utilized by the system.

In operation, a warehouse employee loads an order onto a cart and then positions that cart above the floor slot with the lug extending into the slot. The cart will have means such as electrical or mechanical probes which can be placed in different positions for indicating where the cart should go and a dog on the continuously moving tow chain eventually engages the lug and starts moving the cart on its journey to its designated destination, such as a specified terminal or bay at the warehouse loading dock. Typically, the drive mechanism for each tow chain has a variable speed control so that the tow chain can be driven at a speed of between 80 feet and 120 feet per minute.

In a typical section of a towveyor system a continuous tow chain is arranged to travel in an elongate loop with a 180° degree turn at each end of the loop. Of course, other sections will have paths of different configurations which may have other types of turns such as 45°, 90° and 120° turns. Each turn has some form of means for bearing and guiding the tow chain around the turn, one such means being a turn chain assembly. The turn chain assembly includes a continuous turn chain comprising a plurality of bearing rollers rotatably journaled between links of the turn chain, an arcuate bearing guide plate having a concave front bearing surface, an arcuate return guide plate situated behind the bearing guide plate and stationary turn posts mounted at each end of the turn in so-called clean out boxes. The bearing guide plate and the return guide plate are generally parallel spaced and extend between the two clean out boxes. A section of the turn chain is situated between the tow chain and the front surface of the bearing guide plate to provide a means for bearing the tow chain around the turn while the remainder of the turn chain is trained around each of the turn posts and onto the surface of the return guide plate facing the bearing guide plate.

Typically each of the turn posts is defined by a short section of 4 inch pipe with one post being rigidly fixed in position and the other post being adjustably mounted so that its position can be adjusted to take up slack in the turn chain and to facilitate installation and removal of the turn chain.

From time to time during the operation of the towveyor system, bearing rollers of the turn chain become jammed and flats are worn onto them. These flats wear grooves into the turn posts. After five or six flats have developed on the rollers, the turn chain, and frequently the turn posts also, must be replaced. As a result the present average life of a turn chain and turn posts is approximately one to three years depending on how well they are maintained (e.g., lubricated and kept clean).

It will be understood that in a typical towveyor system there are numerous turns and that each time a turn chain needs to be replaced the whole system has to be shut down. This results in a work stoppage in the warehouse. It has been estimated that this work stoppage or down time in a warehouse each time a turn chain needs to be replaced presently costs between $1000.00 and $5000.00 per hour in addition to the cost of the replacement chain. A turn chain has a length from 8 to 40 feet and presently costs about $38.00 per foot. Depending on the length of the turn, the down time is typically between 3 and 10 hours. Thus, turn chain replacements are very costly; and it is a primary object of the present invention to reduce the frequency of turn chain replacements and increase the life of each turn chain in a towveyor system.

SUMMARY OF THE INVENTION

According to the present invention there is provided in a turn chain assembly which is utilized in guiding and bearing a tow chain about a turn in a towveyor system and which includes a bearing guide plate having a front bearing surface, a return guide plate situated behind said bearing guide plate and having a front surface facing said bearing guide plate and a continuous turn chain comprising a plurality of bearing rollers rotatably journaled between links of said turn chain, said turn chain having one portion thereof situated between the tow chain and said front surface of said bearing guide plate and another portion thereof trained on said front surface of said return guide plate, improved guide means at each end of the turn for guiding said turn chain between said bearing guide plate and said return guide plate and comprising at least one roller assembly including a non-rotatable shaft, a larger diameter, rotatable hollow cylinder coaxial with said shaft, and bearing means between said shaft and said cylinder, said turn chain being trained around the outer surface of said cylinder.

BRIEF DESCRIPTION OF THE DRAWINGS

FIG. 3 is a perspective view with a portion broken away of the clean up box which is situated at the other end of the turn shown in FIG. 1 and in which the fixed roller assembly of the invention is mounted;

FIG. 4 is a vertical sectional view of the take up roller assembly and is taken along line 4—4 of FIG. 2;

FIG. 5 is a vertical sectional view of the fixed roller assembly and is taken along line 5—5 of FIG. 3.

DESCRIPTION OF THE PREFERRED EMBODIMENTS

Figure 1:
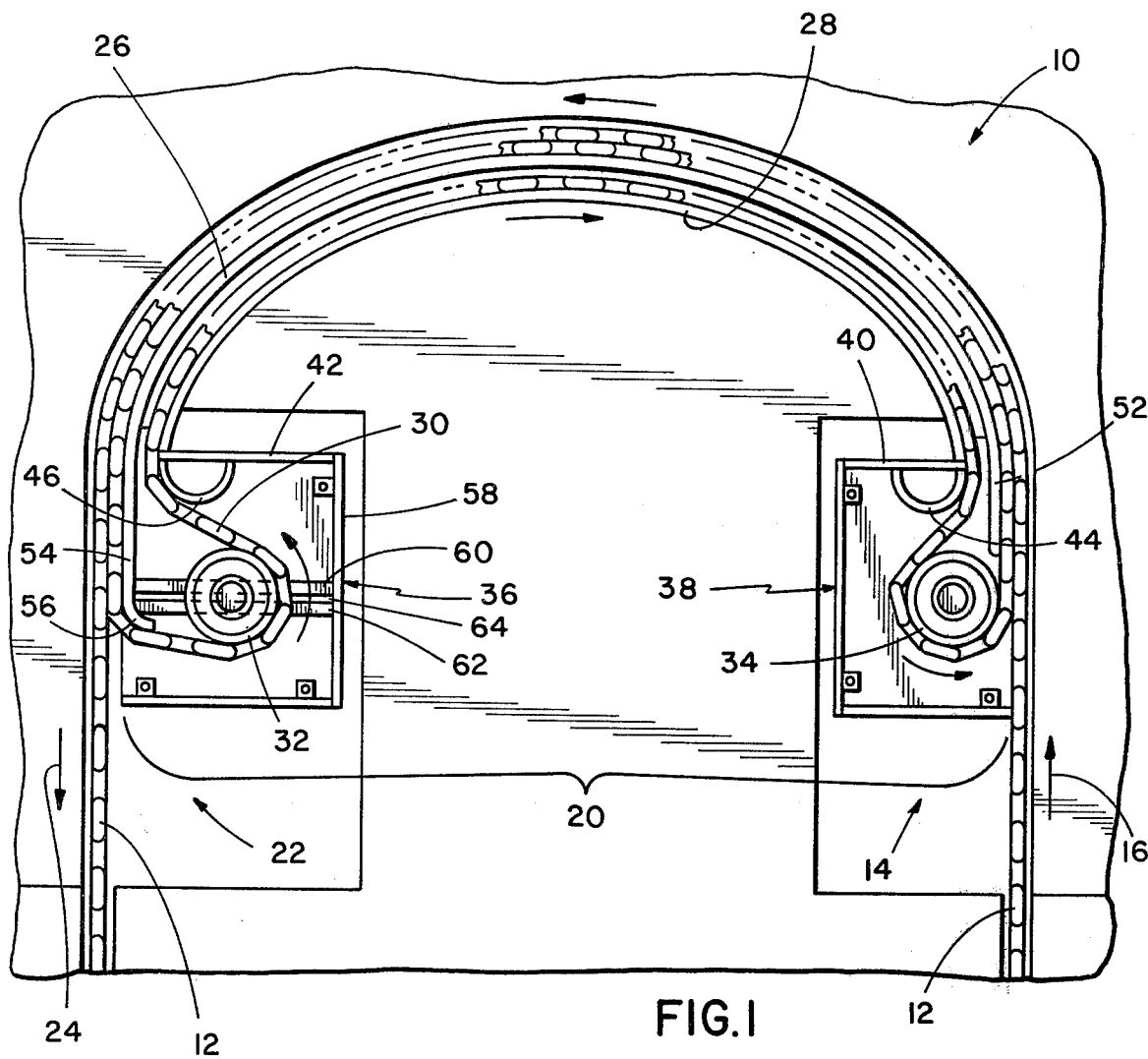
FIG. 1 is a top plan view, with portions of a floor covering removed, of a turn in a towveyor system.

A 180° turn in a towveyor system is illustrated in FIG. 1 and generally identified by the reference numeral 10. As shown, a section of tow chain 12 enters the turn 10 at an entrance end 14 of the turn 10, as indicated by arrow 16, is guided and carried by a turn chain assembly 20 around the turn 10, and exits from the turn 10 at an exit end 22 of the turn 10, as indicated by arrow 24.

Although not shown it will be understood that the tow chain 12 has conventional spaced apart recessed dogs thereon for engaging lugs depending from carts utilized by the towveyor system and also not shown in the drawings.

The turn chain assembly includes an arcuate bearing guide plate 26, an arcuate return guide plate 28, a continuous turn chain 30, an adjustably mounted take up roller assembly 32 at the exit end 22 of the turn 10 and a fixed roller assembly 34 at the entrance end 14 of the turn 10. As shown the roller assemblies 32 and 34 are mounted, respectively, in clean up boxes 36 and 38, located, respectively, at the exit and entrance ends 22 and 14 of the turn 10. Portions of each box 36 and 38 are cut away to permit travel of the turn chain 30 into and out of each box 36 and 38.

The return guide plate is fixed to and extends in a curve from an end wall 40 of the box 38 to an end wall 42 of the box 36. The bearing guide plate 26 is generally parallel spaced from the return guide plate and extends from a location in the clean up box 38 to a location in the clean up box 36. Fixed to the inside of the end wall 40 is a semi-cylindrical member 44 which is cut from a piece of 4 inch pipe. As shown, the member 44 is secured to the end wall 40 adjacent the free edge thereof and opposite one end of return guide plate 28 thereby to present a curved surface at the one end of plate 28 for guiding turn chain 30 from the one end of plate 28 to the roller assembly 32. In like manner, a similarly formed semi-cylindrical member 46 is fixed to the end wall 42 adjacent the free edge thereof and presents a curved surface at the other end of return guide plate 28 for guiding turn chain 30 from the roller assembly 32 onto the return guide plate 28.

Figure 2:
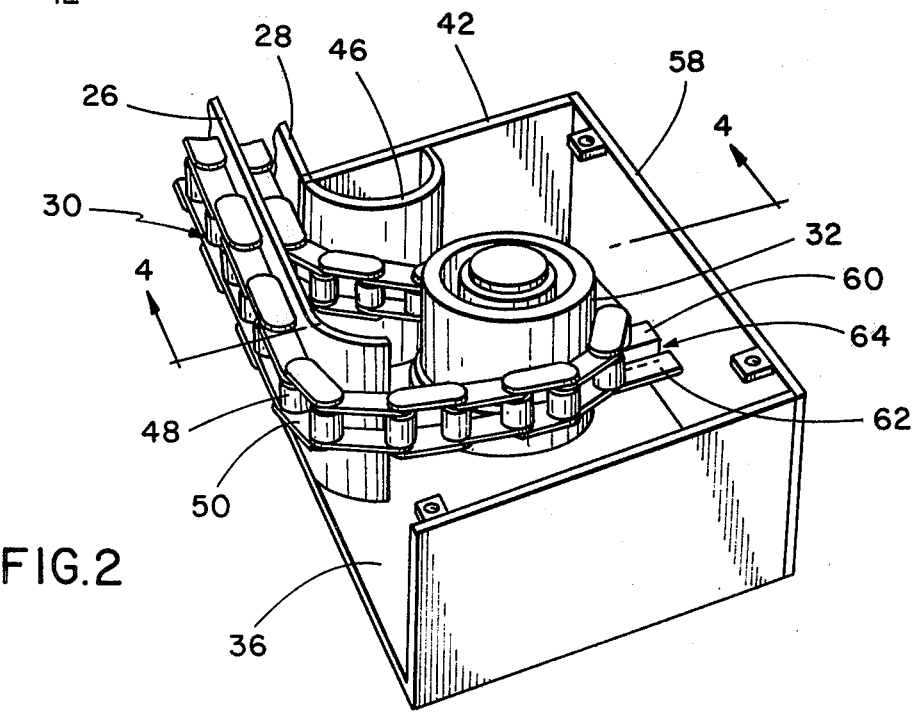
FIG. 2 is a perspective view of the clean up box which is situated at one end of the turn shown in FIG. 1 and in which the adjustable take up roller assembly of the invention is mounted.

As shown in FIG. 2, the turn chain 30 includes a plurality of rollers 48 rotatably journaled between pairs of interconnecting links 50. After coming off of the roller assembly 32, the turn chain 30 rides on a straight end portion 52 of guide plate 26 which extends into the box 38 on a tangent to the periphery of roller assembly 32. From there, the turn chain 30 extends around the turn, along plate 26 and onto a straight portion 54 which ends in a curved end portion 56 of plate 26. The curved end portion 56 has a portion of its periphery on a tangent to the periphery of the roller assembly 32 which is adjustably mounted between a side wall 58 of the box 36 and the straight portion 54 so that assembly 32 can be moved to and away from the curved end portion 56 to take up slack in the turn chain 30. To provide a support for adjustably mounting the roller assembly 32 two elongate pieces of angle iron 60 and 62 are fixed to and between the straight portion 54 and side wall 50 such as by welding and are parallel spaced to define a slot 64 therebetween. A leg of each "L" of each piece 60, 62 extends downwardly opposite and spaced from a similar leg of the other piece 62, 60 to define the slot 64 therebetween and thereby provide a strong mounting support for the roller assembly 32 as will be more fully explained hereinafter in connection with the description of FIG. 4.

Referring to FIGS. 1, 2, and 4, the take up roller assembly 32 includes a stub shaft 66, a larger diameter hollow cylinder 68 coaxial with the shaft 66 and a pair of axially spaced ball bearings 70 and 72 situated between the shaft 66 and the cylinder 68 for rotatably mounting the cylinder 68 on the shaft 66.

In the illustrated embodiment the outer races 70a and 72a of each of the ball bearings 70, 72 is press fitted into the cylinder 68 and the inner races 70b and 72b are fixed to the shaft 66 by means of set screws 74 and 76. Two holes 78, 80 are bored through the cylinder 68 to permit a tool to be inserted into the roller assembly 32 for tightening or loosening the set screws 74 and 76. Note that the holes 78, 80 are located at the top and bottom of the cylinder 68 so as not to interfere with the surface area of the cylinder 68 on which ride the rollers 48 of turn chain 30. This surface area is preferably very smooth to facilitate rolling of the rollers 48 around the cylinders 68 while at the same time the bearings 70, 72 permit the rollers 48 to be carried by the roller assembly 32 around the axis of the shaft 66 on the periphery of the cylinder 68. In this way jamming of the turn chain 30 is minimized if not altogether prevented and the life of the turn chain 30 is increased substantially over the life of turn chains utilized with turn posts in conventional turn chain assemblies.

Preferably the cylinder 68 is made of steel, has an O.D. of approximately 4.5 inches, has a wall thickness between 0.25 and 0.75 inches depending on the size of the bearings used and has a length of from 3 to 4.125 inches. The shaft 66 has an O.D. of from 1.5 to 2.0 inches depending upon the size of the bearings used. Also, although ball bearings are illustrated in the drawings roller bearings can be used in place thereof.

Around the cylinder 68 is a collar 82 which has an upper bevel surface 84. The collar 82 serves to maintain the vertical position of the turn chain 30 as it travels around the cylinder 68 and prevents the turn chain from sagging at this point in its travel. The beveled surface 84 minimizes frictional engagement of the turn chain 30 with the collar 82. The collar 82 can be press fitted onto the cylinder 68 or fixed thereto by means of set screws.

A portion 86 of the shaft 66 projects axially of the cylinder 68 for mounting the roller assembly 32 in the box 36. More specifically the mounting portion 86 has a diametrically disposed, generally rectangularly shaped boss 88 formed thereon which is sized to fit slidably into the slot 64. The shaft 66 also has an axial threaded bore 90 which extends into the boss 88 and into the body of the shaft 66 for receiving a threaded fastener 92.

It will be understood that the boss 88 is slidable in the slot 64 to permit adjustment of the position of the roller assembly 32 for taking up slack in the turn chain 30. When the turn chain is taut the fastener 92 is tightened to secure the take up roller assembly 32 in the desired position and to fix the shaft 66 against rotation Referring now to FIGS. 1, 3 and 5 it is apparent that the fixed roller assembly 34 is substantially identical to the roller assembly 32. Accordingly like parts have been given the same reference number but with the pre fix numeral one added thereto. For example stub shaft 166 of roller assembly 34 corresponds to shaft 66 of roller assembly 32.

Accordingly roller assembly 34 includes, in addition to stub shaft 166, cylinder 168, roller bearings 170, 172, set screws 174, 176, holes 178 and 180 in cylinder 168, collar 182 with bevel surface 184 and a projecting mounting portion 186 at one end of shaft 166. The roller assembly 34 also includes a mounting plate 190 which is fixed to a bottom wall of the clean up box 38 such as by welding. The plate 190 has a centrally located circular hole 195 therein in which the mounting portion 186 of shaft 166 is received and secured such as by welding. In this way, once installed, the shaft 166 is permanently fixed in place against rotation.

The configurations of the parts of roller assembly 34 are substantially identical to the configurations of the parts of roller assembly 32 except for the different configurations of shaft mounting portions 86 and 186 and the lengths of the shafts 66, 166 and the cylinders 68, 168. In this respect the shaft 168 is preferably between 6.125 and 6.875 inches long and cylinder 168 is preferably between 5.0 and 5.50 inches long. Also, since the bottom of cylinder 168 is closer to the bottom wall of box 38 than is cylinder 68 to the bottom wall of box 36, the collar 182 is higher on cylinder 168 than collar 82 is on cylinder 68 so that both collars 82 and 182 will be at substantially the same absolute height to maintain a substantially horizontal path of travel for turn chain 30.

From the foregoing description it will be apparent that the roller assemblies of the present invention for use in a turn chain assembly provide a number of advantages and operating efficiencies in a towveyor system some of which advantages are inherent in the invention and others of which are as follows:

1. Though more expensive than sections of pipe, the roller assemblies are much less expensive than a length of turn chain which would have to be replaced much more frequently in conventional turn chain assemblies using sections of pipe for turn posts.

2. By substantially reducing the number of times a turn chain and or turn post need to be replaced a substantial savings on both down time or work stoppage costs and turn chain replacement costs are obtained.

3. Empircially it has been determined that the reductions in friction in turns utilizing the roller assemblies 32 and 34 of the invention have brought about a surprising reduction of roughly 30 per cent in the amount of electric power needed to operate a towveyor system.

Also from the foregoing description it will be apparent that obvious modifications can be made to the roller assemblies of the invention without departing from the spirit or scope of the invention. Accordingly the scope of the invention is only to be limited as necessitated by the accompanying claims.

I claim:

1. In a turn chain assembly which is utilized in guiding and bearing a tow chain about a turn in a towveyor system and which includes a bearing guide plate having a front bearing surface, a return guide plate situated behind said bearing guide plate and having a front surface facing said bearing guide plate, a continuous turn chain comprising a plurality of bearing rollers rotatably journaled between links of said turn chain, said turn chain having one portion thereof situated between the two chain and said front surface of said bearing guide plate and another portion thereof trained on said front surface of said return guide plate, and guide means at each end of the turn for guiding said turn chain between said bearing guide plate and said return guide plate, the improvement residing in said guide means comprising at least one roller assembly including a non-rotatable, shaft, a larger diameter, rotatable hollow cylinder coaxial with said shaft, and bearing means between said shaft and said cylinder, said turn chain being trained around the outer surface of said cylinder.

2. The turn chain assembly according to claim 1 wherein said bearing means includes two ball bearings.

3. The turn chain assembly according to claim 1 wherein said roller assembly further includes a collar fixed on said cylinder for maintaining said turn chain at a predetermined height while it travels around said cylinder.

4. The turn chain assembly according to claim 1 including two of said roller assemblies, one at each end of the turn, one of said roller assemblies being fixed and being arranged to guide said turn chain from said return guide plate onto said bearing guide plate and the other of said roller assemblies being adjustable to take up slack in said turn chain and being arranged to guide said turn chain from said bearing guide plate onto said return guide plate.

5. The turn chain assembly according to claim 1 wherein said roller assembly is fixed in position and arranged to guide said turn chain from said return guide plate onto said bearing guide plate.

6. The turn chain assembly according to claim 1 wherein said roller assembly is adjustably mounted in order that its position can be adjusted to take up slack in said turn chain and is arranged to guide said turn chain from said bearing guide plate onto said return guide plate.

7. The turn chain assembly according to claim 6 wherein said shaft of said roller assembly has a diametrically disposed, generally rectangular boss which projects from one end thereof and which is slidably received in a slot, and said roller assembly includes means for releasably securing said boss at a particular position in said slot.

8. For use in a turn chain assembly for guiding a tow chain about a turn in a towveyor system, a roller assembly including a stub shaft, a larger diameter, rotatable, hollow cylinder coaxial with said stub shaft, bearing means situated between said cylinder and said stub shaft, a portion of said stub shaft extending axially beyond one end of said cylinder for mounting said roller assembly in said turn chain assembly, and a collar fixed on said cylinder for maintaining a turn chain trained around said cylinder at a predetermined height while it travels around said cylinder.

9. The roller assembly according to claim 8 wherein said axially extending mounting portion of said stub shaft has a diametrically disposed, generally rectangularly shaped boss projecting therefrom and a threaded bore extending axially therein through said boss and into the body of said shaft, said boss being slidably receivable in a slot and said bore being adapted to receive a threaded fastener for releasably securing said boss in a desired position in the slot.

10. The roller assembly according to claim 8 wherein said bearing means includes two axially spaced ball bearings.

* * * * *

UNITED STATES PATENT OFFICE
CERTIFICATE OF CORRECTION

PATENT NO. : 3,951,484
DATED : April 20, 1976
INVENTOR(S) : John H. Bowman, Jr.

It is certified that error appears in the above-identified patent and that said Letters Patent are hereby corrected as shown below:

In the title page, Item [73], after "Worth, Ill."

insert --each a part interest--

Column 5, line 53 change "two" to --tow--;

line 60 after "non-rotatable" delete ",".

Signed and Sealed this

Twenty-first Day of September 1976

[SEAL]

Attest:

RUTH C. MASON
Attesting Officer

C. MARSHALL DANN
Commissioner of Patents and Trademarks